(12) United States Patent
Nabeta et al.

(10) Patent No.: US 10,483,657 B2
(45) Date of Patent: Nov. 19, 2019

(54) MANUFACTURING METHOD FOR ELECTRIC WIRE HAVING TERMINAL

(71) Applicant: Yazaki Corporation, Minato-ku, Tokyo (JP)

(72) Inventors: Yasunori Nabeta, Makinohara (JP); Kazuhide Takahashi, Makinohara (JP); Naoki Ito, Makinohara (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 70 days.

(21) Appl. No.: 15/608,354

(22) Filed: May 30, 2017

(65) Prior Publication Data

US 2017/0346197 A1    Nov. 30, 2017

(30) Foreign Application Priority Data

May 31, 2016    (JP) .................................. 2016-108900

(51) Int. Cl.
*H01R 43/00*    (2006.01)
*H01R 4/20*    (2006.01)
(Continued)

(52) U.S. Cl.
CPC ............. *H01R 4/206* (2013.01); *B23K 20/10* (2013.01); *H01R 4/023* (2013.01);
(Continued)

(58) Field of Classification Search
CPC ........ H01R 4/206; H01R 4/625; H01R 4/187; H01R 4/023; H01R 43/0207;
(Continued)

(56) References Cited

U.S. PATENT DOCUMENTS 6,100,626 A    8/2000 Frey et al.
8,816,204 B2   8/2014 Takayama et al.
(Continued)

FOREIGN PATENT DOCUMENTS

CN    102089940 A    6/2011
CN    102598435 A    7/2012
(Continued)

OTHER PUBLICATIONS

English Translation of (JP2011090804) Masahiro.*
(Continued)

*Primary Examiner* — Thiem D Phan
(74) *Attorney, Agent, or Firm* — Banner & Witcoff, Ltd.

(57) ABSTRACT

A manufacturing method for an electric wire having a terminal includes a step of connecting a plurality of core wires by an ultrasonic connection process to form a connected core wire. In the step, the core wires are formed into the connected core wire having a cross-sectional shape having a width and a height in a plane orthogonal to an axis of the connected core wire, the width is not longer than a length obtained by subtracting two times a thickness of the terminal from a width of an arch groove of a crimper of a crimping apparatus in a state that a space between a support surface of an anvil of the crimping apparatus and the arch groove defines a predetermined crimped shape.

2 Claims, 7 Drawing Sheets

(51) Int. Cl.
*B23K 20/10* (2006.01)
*H01R 4/02* (2006.01)
*H01R 43/048* (2006.01)
*H01R 43/05* (2006.01)
*B21F 15/08* (2006.01)

(52) U.S. Cl.
CPC ......... *H01R 43/0488* (2013.01); *H01R 43/05* (2013.01); *B21F 15/08* (2013.01); *H01R 43/048* (2013.01); *Y10T 29/49174* (2015.01)

(58) Field of Classification Search
CPC .. H01R 43/0488; H01R 43/05; H01R 43/048; H01R 43/058; B23K 20/10; B21F 15/08; Y10T 29/53235; Y10T 29/49181; Y10T 29/49185; Y10T 29/49174; Y10T 29/5193; Y10T 29/53209; Y10T 29/53213; Y10T 29/5327
USPC .................. 29/857, 861, 863, 867, 874, 882
See application file for complete search history.

(56) References Cited

U.S. PATENT DOCUMENTS

| | | | |
|---|---|---|---|
| 9,088,079 | B2 | 7/2015 | Kumakura et al. |
| 9,391,418 | B2 | 7/2016 | Stull et al. |
| 2011/0094797 | A1 | 4/2011 | Otsuka et al. |
| 2012/0205423 | A1 | 8/2012 | Takayama |
| 2013/0025935 | A1 | 1/2013 | Takayama et al. |
| 2013/0252489 | A1 | 9/2013 | Kumakura et al. |
| 2015/0047182 | A1 | 2/2015 | Charlton et al. |
| 2015/0047189 | A1 | 2/2015 | Stull et al. |

FOREIGN PATENT DOCUMENTS

| | | |
|---|---|---|
| CN | 102844940 A | 12/2012 |
| CN | 103326143 A | 9/2013 |
| CN | 105474479 A | 4/2016 |
| JP | 2009-231079 A | 10/2009 |
| JP | 2011-090804 A | 5/2011 |
| JP | 2014-029884 A | 2/2014 |
| KR | 20160039363 A | 4/2016 |
| WO | 2015140668 A1 | 9/2015 |

OTHER PUBLICATIONS

Jun. 28, 2018—(JP) Notification of Reasons for Refusal—App 2016-108900.
Sep. 26, 2018—(CN) First Office Action—App 201710400839.8.
Jan. 29, 2019—(JP) Notification of Reasons for Refusal—App 2016-108900.

\* cited by examiner

MANUFACTURING METHOD FOR ELECTRIC WIRE HAVING TERMINAL

CROSS REFERENCE TO RELATED APPLICATIONS

This application is based on Japanese Patent Application (No. 2016/108900) filed on May 31, 2016, the contents of which are incorporated herein by reference.

BACKGROUND

The present invention relates to a manufacturing method for an electric wire having a terminal in which a terminal is crimped to an electric wire having a core wire bundle with a plurality of conductor core wires bundled.

Usually, from a viewpoint that an allowable electric current of an electric wire is increased and a bending strength is improved, an electric wire is proposed which has a core wire bundle (for instance, a twisted wire) with a plurality of conductor core wires bundled. When a terminal is crimped to such a core wire bundle (the twisted wire), the conductor core wire located in an outer peripheral side of the core wire bundle directly comes into contact with the terminal and is electrically connected to the terminal. However, the conductor core wire located in a central part of the core wire bundle is electrically connected to the terminal through the conductor located in the outer peripheral part of the core wire bundle. Accordingly, in order to improve an entire electric conductivity between the core wire bundle and the terminal, it is desirable that not only the electric conductivity (the electric conductivity of the outer peripheral part) between the conductor core wire and the terminal, but also the electric conductivity (the electric conductivity of the central part) between the conductor core wires is improved.

On the other hand, in recent years, aluminum and aluminum alloy may be sometimes used as a material of the conductor core wire for the reason that the aluminum and the aluminum alloy are lighter and lower in cost than copper. However, in this case, since an insulating property of an oxide film (aluminum oxide) naturally formed on a surface of the conductor core wire is high, such a contrivance as to improve the above-described electric conductivity is especially required. Specifically, it is required to improve the electric conductivity of the outer peripheral part and the electric conductivity of the central part of the core wire bundle.

Thus, for instance, in one of usual manufacturing methods for an electric wire having a terminal (refer it to as a "usual manufacturing method", hereinafter.), an ultrasonic connection or welding process is applied to a core wire bundle (a twisted wire) formed with conductor core wires made of aluminum so that oxide films on the surfaces of the conductor core wires are broken to connect the conductor core wires together and form integrally the core wire bundle to be a single wire. Thus, both the conductor core wire located in the outer peripheral part of the core wire bundle and the conductor core wire located in the central part come into substantially direct contact with the terminal. As a result, since the electric conductivity of the central part is more improved than a case that the above-described single wire is not formed, an entire electric conductivity between the core wire bundle and the terminal may be the more improved (for instance, see patent literature 1.).

[Patent Literature 1] JP-A-2009-231079

SUMMARY OF INVENTION

An object of the present invention is to provide a manufacturing method for an electric wire having a terminal in which the terminal can be crimped to a connected core wire while a connected state of the connected core wire having a plurality of conductor core wires connected together is maintained as much as possible.

According to one aspect of the invention, there is provided a manufacturing method for an electric wire having a terminal, including:

a step of connecting a plurality of core wires by an ultrasonic connection process to form a connected core wire;

a step of arranging the connected core wire on a base bottom part of a terminal between a pair of crimping pieces extended from the base bottom part;

a step of setting the terminal on which the connected core wire is arranged on an anvil of a crimping apparatus so that the base bottom part is supported on a support surface of the anvil, under a crimper of the crimping apparatus; and a step of crimping the terminal to the connected core wire by causing the anvil and the crimper to come close to each other and deforming the crimping pieces by an arch groove of the crimper until a space between the support surface and the arch groove defines a predetermined crimped shape, wherein, in the step of connecting the plurality of core wires, the core wires are formed into the connected core wire having a cross-sectional shape having a width and a height in a plane orthogonal to an axis of the connected core wire, the width is not longer than a length obtained by subtracting two times a thickness of the terminal from a width of the arch groove in a state that the space defines the predetermined crimped shape.

The height of the cross-sectional shape formed in the step of connecting the plurality of core wires which is orthogonal to the width of the cross-sectional shape may be not shorter than a length obtained by subtracting two times the thickness of the terminal from a maximum distance between the support surface and circular arc surfaces of the arch groove in the state that the space defines the predetermined crimped shape.

The plurality of conductor core wires may be made of at least one of aluminum and aluminum alloy.

BRIEF DESCRIPTION OF DRAWINGS

FIGS. 1A to 1D are respectively perspective views in an end part of the electric wire.

FIGS. 2A to 2C are diagrams which explain the electric wire to which the terminal is crimped.

FIGS. 5A and 5B are diagrams which explain a method for attaching or welding the terminal under pressure by the terminal crimping apparatus.

DETAILED DESCRIPTION OF EXEMPLIFIED EMBODIMENTS

A connection force by the ultrasonic connection process is ordinarily smaller than a connection force by connection methods other than the ultrasonic connection process (for instance, a welding or soldering method). Accordingly, when an excessively large external force is applied to the core wire bundle (a connected core wire) which undergoes the ultrasonic connection process, the conductor core wires cannot maintain the connected state. The core wire bundle may be possibly separated to a plurality of conductor core wires so that a connected part is broken to cancel a form of the single wire. In this case, an oxide film is formed again on the surfaces of the separated conductor core wires so that the above-described effect of the form of integration (the form of the single wire) may be damaged.

When the terminal is crimped to the electric wire by the usual manufacturing method, in a process that the terminal is caulked to the core wire bundle to which the ultrasonic connection method is applied, the core wire bundle is pressed and deformed until the core wire bundle has a prescribed crimped form that is a form after a crimping operation is finished. From a viewpoint for improvement of the entire electric conductivity between the core wire bundle and the terminal, the cancellation of the form of the single wire of the core wire bundle is desirably prevented as much as possible during the pressing and deformation process.

By referring to the drawings, a manufacturing method for an electric wire having a terminal according to an embodiment of the present invention will be described below.

Figure 1A:
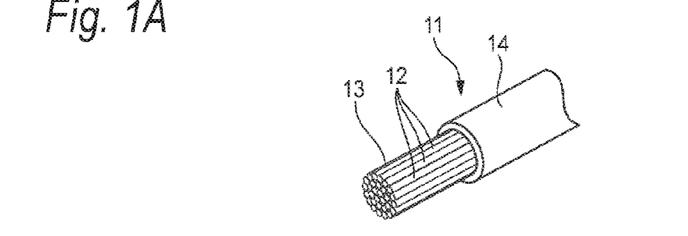
FIGS. 1A to 1D are diagrams which explain an outline of a manufacturing method for an electric wire having a terminal according to an exemplary embodiment of the present invention.
Figure 1B:
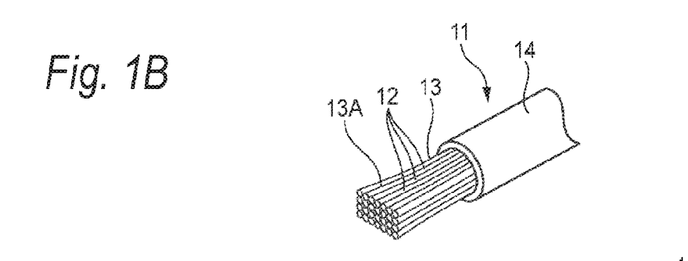
Figure 1C:
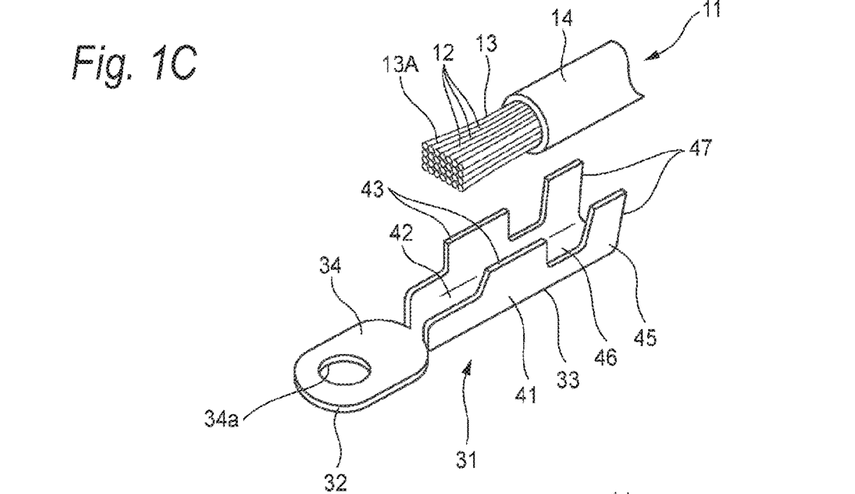
Figure 1D:
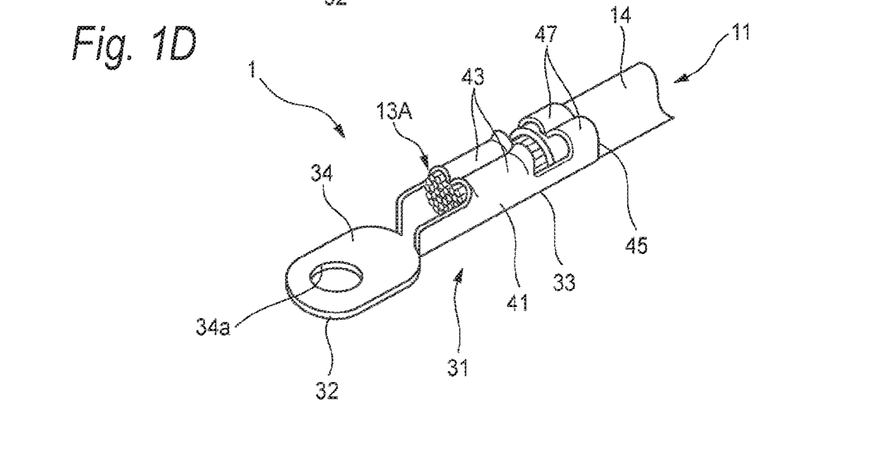

In the manufacturing method for an electric wire having a terminal according to the present embodiment, initially, as shown in FIG. 1A, an insulating coat 14 of an electric wire 11 is peeled to expose a core wire bundle 13 formed with a plurality of conductor core wires 12. Then, as shown in FIG. 1B, an ultrasonic connection process is applied (a detail will be described below.) to the core wire bundle 13 to form a connected core wire 13A having the adjacent conductor core wires 12 connected together. Then, after the connected core wire 13A is installed on a prescribed position of a terminal 31 as shown in FIG. 1C, and the terminal 31 is crimped to the connected core wire 13A (and the insulating coat 14 in the periphery thereof) as shown in FIG. 1D. Thus, an electric wire 1 having a terminal is manufactured.

Figure 2A:
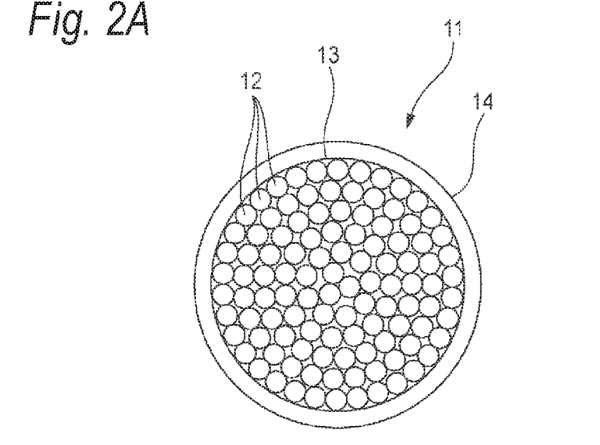
FIG. 2A is a front view of the end part of the electric wire.

As shown in FIGS. 1A and 2A, the electric wire 11 is formed in such a way that an outer periphery of the core wire bundle 13 having the plurality of conductor core wires 12 bundled is covered with the insulating coat 14. In the present example, the conductor core wire 12 is a non-plated element wire made of at least one of aluminum and aluminum alloy. In other words, the electric wire 11 is at least one of an aluminum electric wire and an aluminum ally electric wire.

Figure 2B:
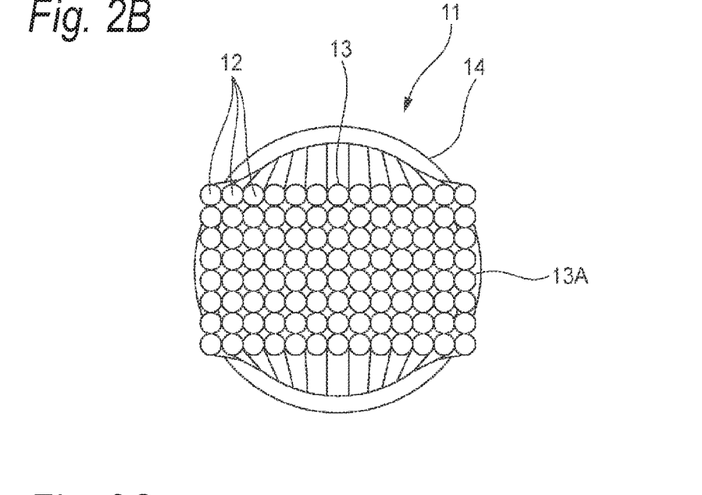
FIG. 2B is a front view of the end part of the electric wire having a connected core wire formed.

As shown in FIG. 1B and FIG. 2B, the connected core wire 13A obtained by connecting the core wire bundle 13 of the electric wire 11 under the ultrasonic connection process has a sectional shape orthogonal to an axis of the connected core wire 13A. The sectional shape may be a shape having a width and height orthogonal to each other. The sectional shape is a rectangular shape in the present embodiment, but it may be any other shape having the width and height such as an oblong shape. In the connected core wire 13A, the plurality of conductor core wires 12 forming the core wire bundle 13 are connected together by ultrasonic vibration.

Figure 3:
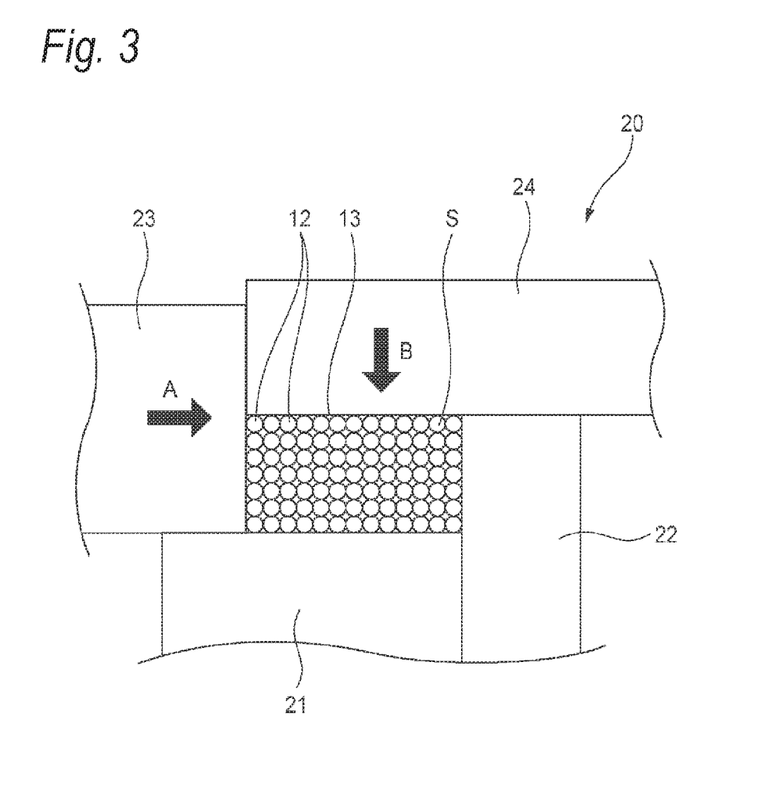
FIG. 3 is a schematic view of a ultrasonic connection apparatus which applies a ultrasonic connection process to a core wire bundle.

As shown in FIG. 3, an ultrasonic connection apparatus 20 which connects together the core wire bundle 13 of the electric wire 11 by the ultrasonic connection process includes a hone 21, an anvil plate 22, a gliding jaw 23 and an anvil 24. The hone 21 makes an ultrasonic oscillation forward and backward in a sheet surface of the drawing by an ultrasonic oscillator. On an upper surface of the hone 21 (a surface which comes into contact with the core wire bundle), a roulette (an illustration is omitted) is formed which has a plurality of protrusions extending in a direction intersecting at right angles to a vibrating direction to suppress a slide between the upper surface of the hone 21 and the core wire bundle 13. In the ultrasonic connection apparatus 20, a space rectangular in section which is defined by the hone 21, the anvil plate 22, the gliding jaw 23 and the anvil 24 is set as a forming space S. The conductor core wires 12 of the core wire bundle 13 arranged in the forming space S are connected together by the ultrasonic connection process.

The anvil plate 22 is arranged in a side part of the hone 21. The gliding jaw 23 is arranged at a position opposed to the anvil plate 22 on the upper surface of the hone 21. The gliding jaw 23 can be moved so as to come close to or to be separated from the anvil plate 22. In FIG. 3, the gliding jaw 23 moves in a direction shown by an arrow mark A in the drawing to press the core wire bundle 13 to this direction.

The anvil 24 is arranged in an upper part of the hone 21 and the anvil plate 22 and lifted and lowered so that the anvil 24 may come close to or be separated from the hone 21. In FIG. 3, the anvil 24 moves in a direction shown by an arrow mark B in the drawing to press the core wire bundle 13 in this direction.

The ultrasonic connection apparatus 20 moves the gliding jaw 23 and the anvil 24 in the directions as described above, so that width and height of the forming space S can be freely changed. Therefore, the ultrasonic connection apparatus 20 is configured to change the width and the height of the connected core wire 13A.

As shown in FIG. 1C, the terminal 31 has an electric connection part 32 and a crimping part 33. The terminal 31 is formed by press working a metal sheet formed with an electrically conductive metal material, for instance, copper or copper alloy. Accordingly, in this exemplary embodiment, a thickness of the terminal 31 is substantially the same in any positions.

The electric connection part 32 has a flat plate shaped connection plate part 34. In the connection plate part 34, a connection hole 34a is formed. The connection plate part 34 is electrically connected to a terminal base of a connection device by, for instance, inserting a fastening bolt into the connection hole 34a.

The crimping part 33 has a conductor crimping part 41 and a sheath crimping part 45 in order from the electric connection part 32 side. The conductor crimping part 41 includes a base bottom part 42 and one pair of conductor crimping pieces 43 (crimping pieces) formed in both side parts of the base bottom part 42. On the base bottom part 42, the connected core wire 13A is mounted. The conductor crimping pieces 43 are extended from the base bottom part 42 so as to hold the connected core wire 13A between them. The conductor crimping part 41 deforms the one pair of conductor crimping pieces 43 so as to be bent inside (caulked), so that the conductor crimping part 41 is crimped to the connected core wire 13A of the electric wire 11. Thus, the terminal 31 is electrically conducted and connected to the core wire bundle 13 of the electric wire 11.

The sheath crimping part 45 includes a base bottom part 46 and one pair of sheath crimping pieces 47 formed in both side parts of the base bottom part 46. The base bottom part 46 of the sheath crimping part 45 is extended from the base bottom part 42 of the conductor crimping part 41. On the base bottom part 46, the insulating coat 14 of the electric wire 11 is mounted. The sheath crimping pieces 47 are extended from the base bottom part 46 so as to hold the insulating coat 14 part of the electric wire 11 between them. The sheath crimping part 45 deforms the one pair of sheath crimping pieces 47 so as to be bent inside (caulked), so that the sheath crimping part 45 is crimped and fixed to the part of the insulating coat 14 of the electric wire 11.

Figure 4:
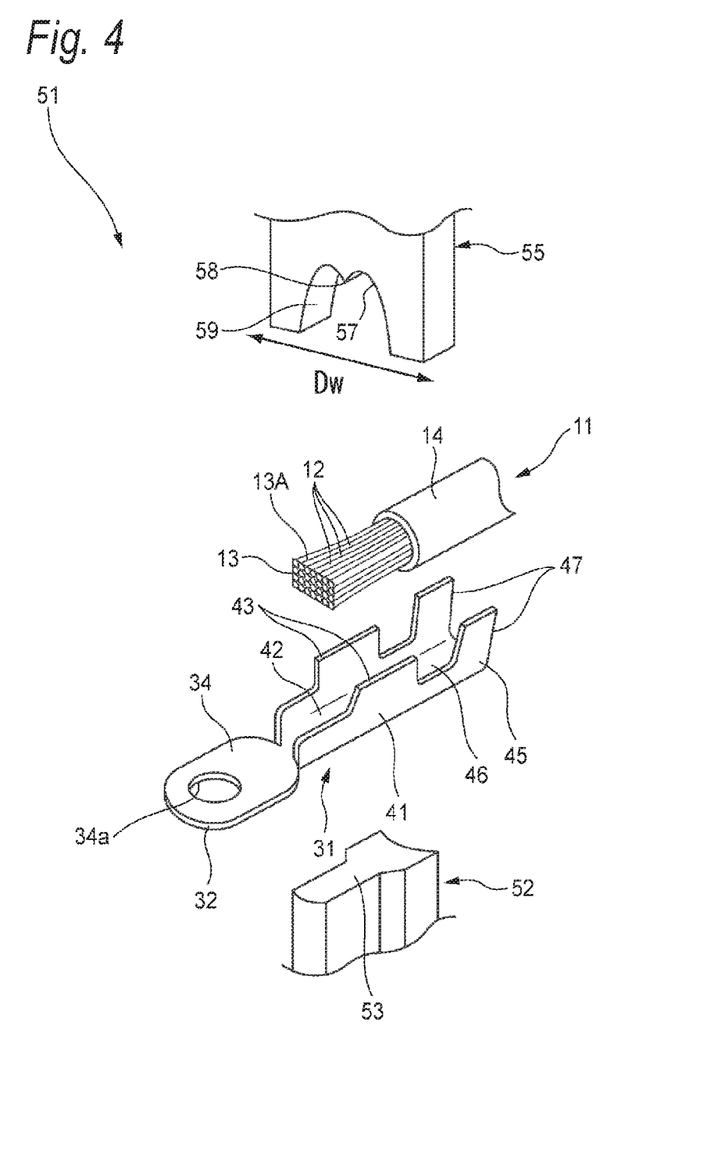
FIG. 4 is a perspective view of a terminal crimping apparatus which attaches or welds the terminal under pressure to the electric wire and the electric wire.
Figure 5A:
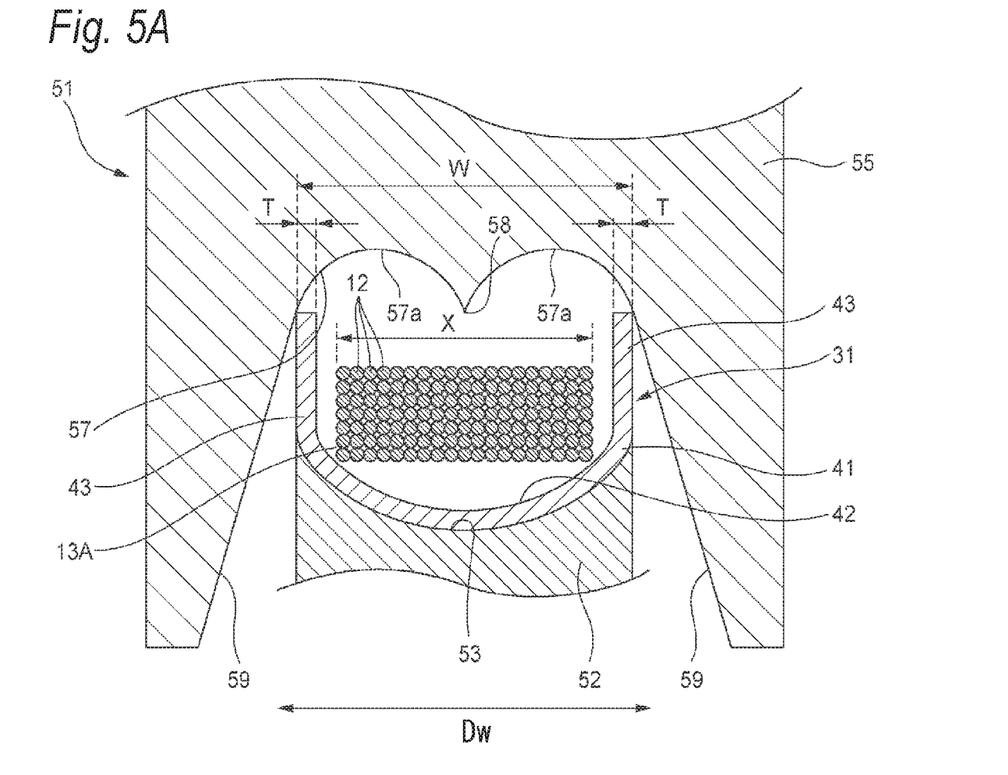
FIG. 5A is a front view of the terminal crimping apparatus in which the terminal and the connected core wire of the electric wire are arranged.
Figure 5B:
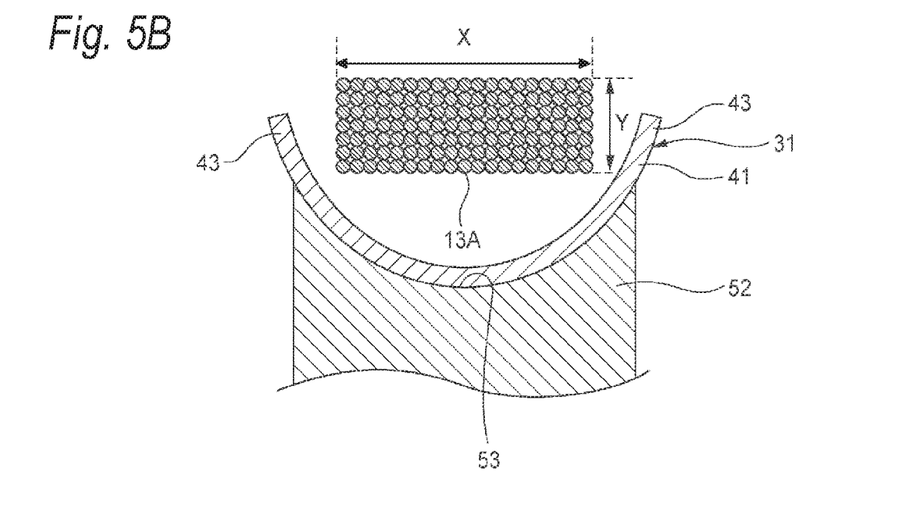
FIG. 5B is a front view of an anvil on which the terminal and the connected core wire of the electric wire are arranged.

As shown in FIG. 4 and FIGS. 5A and 5B, the terminal 31 is crimped to the electric wire 11 by a terminal crimping apparatus 51. The terminal crimping apparatus 51 has an anvil 52 and a crimper 55. The anvil 52 is arranged in a lower part of the terminal 31 and the connected core wire 13A. The crimper 55 is arranged in an upper part of the terminal 31 so that the connected core wire 13A is to be set under the crimper 55. The crimper 55 is movable upward and downward relatively to the anvil 52.

The anvil 52 has, on its top part, a support surface 53 which is bent so as to be recessed downward. When the terminal 31 is crimped to the electric wire, the support surface 53 supports the base bottom part 46 of the terminal 31 thereon. Specifically, an outer surface of the base bottom part 42 of the terminal 31 abuts on the support surface 53.

The crimper 55 is provided with, in a central part of a width direction Dw, an arch groove 57 having a mountain shaped part 58 which protrudes to the anvil 52 side. The arch groove 57 is formed with two circular arc surfaces 57a provided in both sides of the mountain shaped part 58. Each of the circular arc surfaces 57a is a circular arc shaped convex surface protruding to a direction which separates from the support surface 53. The crimper 55 has two guide inclined surfaces 59. The guide inclined surfaces 59 are inclined so as to be gradually separated toward the anvil 52 side. The guide inclined surfaces 59 are formed so as to be continuous to both ends of the arch groove 57.

Subsequently, the manufacturing method for the electric wire 1 having a terminal according to the present embodiment will be described in detail.

As shown in FIG. 1A, the insulating coat 14 of an end part of the electric wire 11 is peeled to expose the core wire bundle 13 having the conductor core wires 12 bundled by a prescribed length. The prescribed length of the exposed core wire bundle 13 may be set to such a length as to sufficiently attach or weld under pressure the terminal 31 to the electric wire.

Figure 2C:
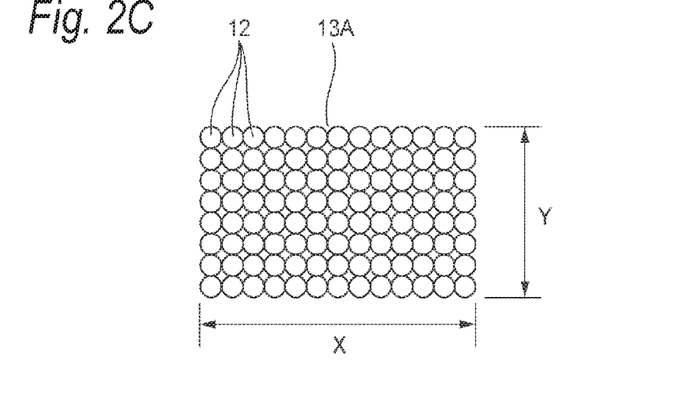
FIG. 2C is a front view of the connected core wire.

As shown in FIG. 1B, the core wire bundle 13 exposed in the end part of the electric wire 11 is connected by the ultrasonic connection process to form the connected core wire 13A having the plurality of conductor core wires 12 connected together. Specifically, as shown in FIG. 3, the exposed core wire bundle 13 is arranged in the forming space S of the ultrasonic connection apparatus 20, the gliding jaw 23 is moved to the direction A in which the gliding jaw 23 comes close to the anvil plate 22 and the anvil 24 is moved to the direction B in which the anvil 24 comes close to the hone 21 to press the core wire bundle 13 in the forming space S from both sides and upper and lower parts. Then, under this state, an ultrasonic vibration is applied to the hone 21. Thus, in the forming space S, the oxide films formed on the surfaces of the conductor core wires 12 are broken to connect the conductor core wires 12 together. Thus, as shown in FIG. 2C, the connected core wire 13A is formed which is rectangular in its sectional form having a width of X and a height of Y. In the connected core wire 13A formed in such a way, the conductor core wires 12 are connected together to be integrated to be the single wire. Thus, the conductor core wires 12 are arranged in a state that the conductor core wires 12 are satisfactorily electrically conducted together.

Figure 6:
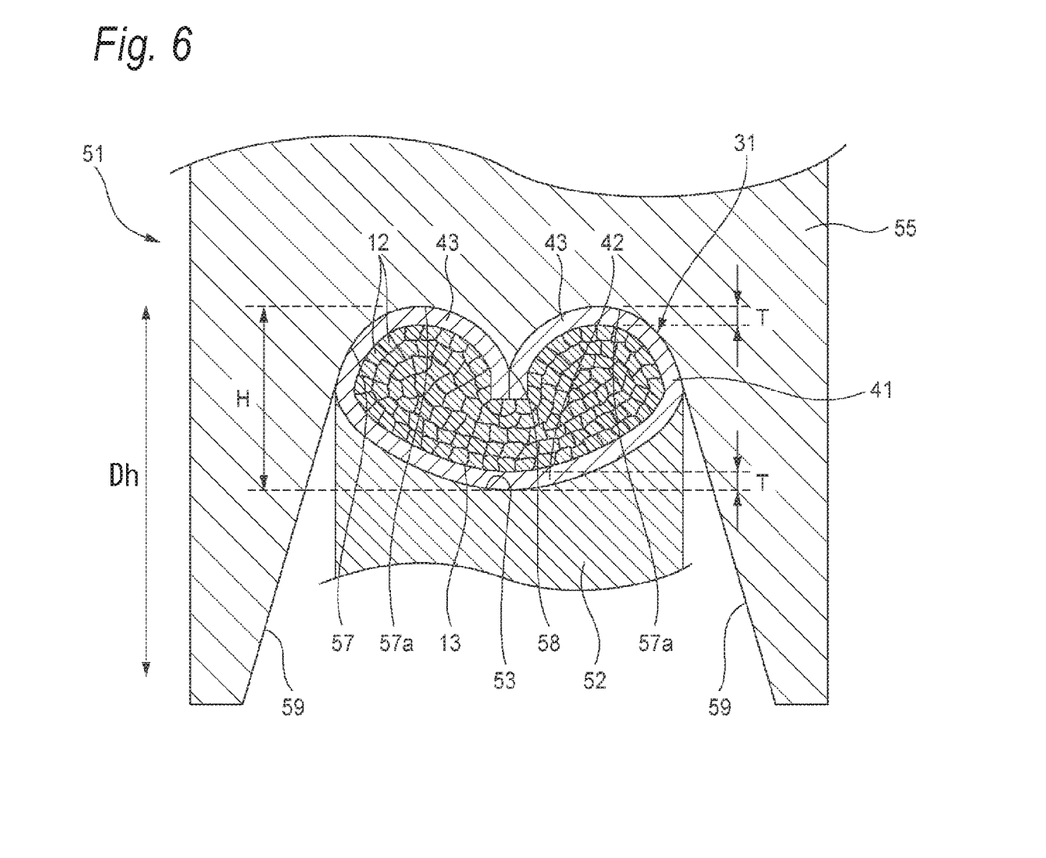
FIG. 6 is a front view of the terminal crimping apparatus under a state that the terminal is crimped to the electric wire.

As shown in FIGS. 5A and 5B, in the ultrasonic connection process, the connected core wire 13A is formed in such a way that a width X of a section orthogonal to an axis of the connected core wire 13A is not more than a value which is obtained by subtracting two times a thickness T of the terminal 31 from a width W of the arch groove 57 formed in the crimper 55 of the terminal crimping apparatus 51. That is, the value X is obtained by a formula "$X \leq W-2T$". Further, as shown in FIG. 6, in the ultrasonic connection process, the connected core wire 13A is formed in such a way that a height Y of the section orthogonal to the axis of the connected core wire 13A is not smaller than a value which is obtained by subtracting two times the thickness T of the terminal 31 from a maximum distance H between the support surface 53 of the anvil 52 and the arch groove 57 at the time of completion of a pressure attachment of the terminal 31 by the terminal crimping apparatus 51. That is, the value Y is obtained by a formula "$Y \geq H-2T$." The thickness T of the terminal 31 is a thickness of a metal sheet forming the terminal 31. Further, for the purpose of convenience, the value (W−2T) that two times the thickness T of the terminal 31 is subtracted from the width W of the arch groove 57 is also referred to as a "reference width". The value (H−2T) that two times the thickness T of the terminal 31 is subtracted from the maximum distance H between the support surface 53 of the anvil 52 and the arch groove 57 of the crimper 55 at the time of completion of a pressure attachment of the terminal 31 by the terminal crimping apparatus 51 is also referred to as a "reference height". In FIG. 6, a height direction is shown as Dh.

As shown in FIG. 1D, the terminal 31 is crimped to the connected core wire 13A by using the terminal crimping apparatus 51. Initially, as shown in FIG. 5B, the terminal 31 is arranged and supported on the support surface 53 of the anvil 52. The end part of the electric wire 11 is arranged in the terminal 31. Here, in the terminal 31 before a crimping process is applied to the terminal 31, a space between inner surface sides of the conductor crimping pieces 43 extended from the base bottom part 42 is sufficiently larger than the value (the reference width) that two times the thickness T of the terminal 31 is subtracted from the width W of the arch groove 57 of the crimper 55. Accordingly, when the connected core wire 13A of the electric wire 11 is arranged in the conductor crimping part 41 of the terminal 31, the connected core wire 13A whose width X is not more than the reference width ($X \geq W-2T$) is not caught by the conductor crimping pieces 43 of the terminal 31 and is arranged in the conductor crimping part 41.

After the end part of the electric wire 11 is arranged in the terminal 31, the crimper 55 is lowered so that the crimper 55 is allowed to come close to the anvil 52 so as to crimp the terminal 31 under pressure to the electric wire 11. At this time, end parts of the conductor crimping pieces 43 of the terminal 31 which are extended to both side parts come into contact with the guide inclined surfaces 59 of the crimper 55. Thus, the conductor crimping pieces 43 are deformed toward directions in which the conductor crimping pieces 43 come close to each other along the guide inclined surfaces 59 of the crimper 55. At this time, since the width X of the section orthogonal to the axis of the connected core wire 13A is not more than the reference width (X≤W−2T), the connected core wire 13A is not pressed by the terminal 31 until the conductor crimping pieces 43 of the terminal 31 reach the arch groove 57 and begin to be bent (until an actual caulking operation starts). Thus, an excessively large external force is prevented from being applied to the connected core wire 13A.

When the crimper 55 is more lowered so that the crimper 55 is allowed to come close to the anvil 52, for the terminal 31, the conductor crimping pieces 43 reach the arch groove 57 (see FIG. 5A). From this state, the conductor crimping pieces 43 are pressed by the arch groove 57 toward directions in which the conductor crimping pieces 43 come close to each other and are deformed so as to be bent inward (rolled up).

Figure 7:
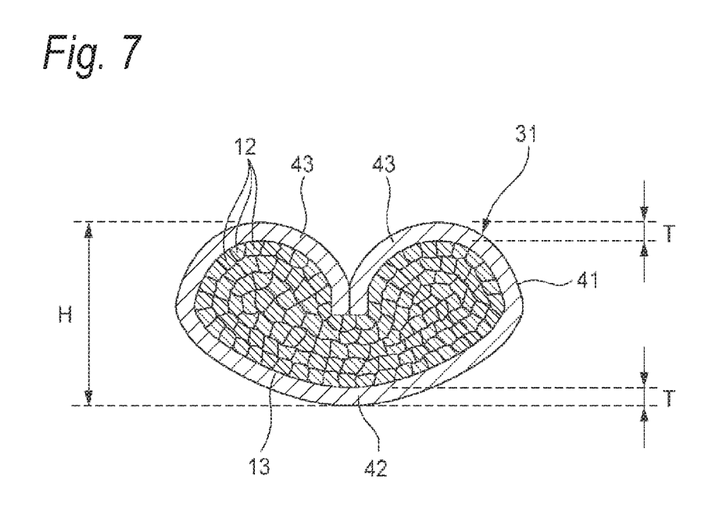
FIG. 7 is a sectional view in a connected or welded part of the electric wire having the terminal where the terminal is crimped to the electric wire.

After that, as shown in FIG. 6, the anvil 52 and the crimper 55 are allowed to come close to each other until the form of a space between the support surface 53 and the circular arc surfaces 57a becomes a predetermined crimped shape. That is, at the time of completion of a crimping of the terminal 31 by the terminal crimping apparatus 51, the space between the support surface 53 and the circular arc surfaces 57a defines the predetermined crimped shape. At this time, the conductor crimping part 41 of the terminal 31 is sandwiched between the anvil 52 and the crimper 55 and pressed to the connected core wire 13A. Thus, as shown in FIG. 7, the terminal 31 is strongly crimped to the core wire bundle 13 (the connected core wire 13A) without gaps. Thus, the terminal 31 is assuredly electrically conducted to the core wire bundle 13 of the electric wire 11.

Here, the height Y of the section of the connected core wire 13A before the connected core wire 13A is crimped to the electric wire is set to the value (the reference height) that two times the thickness T of the terminal 31 is subtracted from the maximum distance H between the support surface 53 of the anvil 52 and the arch groove 57 in a state that the space between the support surface 53 and the circular arc surfaces 57a defines the predetermined crimped shape. Since the height Y is the reference height or larger (Y≤H−2T), an occurrence of voids is suppressed between the connected core wire 13A and the terminal 31 at the time of completion of the crimping.

In the terminal crimping process, the sheath crimping pieces 47 of the terminal 31 are caulked by an anvil and a crimper (illustrations are omitted) for the sheath provided in the terminal crimping apparatus 51. Thus, the sheath crimping part 45 of the terminal 31 is crimped to the insulating coat 14 part of the electric wire 11.

As described above, in the manufacturing method for the electric wire 1 having the terminal according to the present embodiment, since the width X of the sectional shape orthogonal to the axis of the connected core wire 13A is not more than the reference width (X≤W−2T), when the terminal 31 is crimped to the connected core wire 13A, the connected core wire 13A is not pressed by the terminal 31 until the conductor crimping pieces 43 of the terminal 31 reach the arch groove 57 (until the actual caulking operation starts). Thus, an excessively large external force can be prevented from being applied to the connected core wire 13A. The connection of the conductor core wires 12 in the connected core wire 13A can be avoided from being cancelled. Thus, even after the terminal 31 is crimped to the connected core wire 13A, a resistance between the conductor core wires 12 which are connected together by the ultrasonic connection process can be suppressed as much as possible and a satisfactory electric conductivity of the core wire bundle 13 and the terminal 31 can be maintained.

Further, since the height Y of the section of the connected core wire 13A is not smaller than the reference height (Y≥H−2T), the voids or gaps are hardly generated between the connected core wire 13A and the terminal 31 at the time of completion of the crimping of the terminal 31 to the connected core wire 13A. Thus, the electric conductivity between the terminal 31 and the connected core wire 13A can be more improved.

Especially, the manufacturing method of the electric wire having the terminal according to the present embodiment is effective when the terminal 31 is crimped to the electric wire 11 formed with the aluminum electric wire or the aluminum alloy electric wire which has a concern for a deterioration of the electric conductivity between the conductor core wires 12 in the central part of the core wire bundle 13.

The present invention is not limited to the above-described embodiment and various kinds of modified examples may be adopted within a scope of the present invention. For instance, the present invention is not limited to the above-described embodiment and may be suitably modified and improved. In addition thereto, materials, forms, dimensions, numbers, arranged positions or the like of the component elements in the above-described exemplary embodiment may be arbitrarily used as long as the present invention can be achieved and are not limited.

For instance, as the electric wire 11, an electric wire (a copper electric wire) in which a conductor core wire 12 is formed with copper or copper alloy may be used in place of the aluminum electric wire or the aluminum alloy electric wire. Further, as the terminal 31, a terminal formed with aluminum or aluminum alloy may be used in place of the terminal formed with copper or copper alloy.

Here, features of the above-described exemplary embodiment of the manufacturing method for an electric wire having a terminal according to the present invention are respectively briefly summarized in below-described (i) to (iii).

(i) A manufacturing method for an electric wire having a terminal, comprising:

a step of connecting a plurality of core wires (12) by an ultrasonic connection process to form a connected core wire (13A);

a step of arranging the connected core wire (13A) on a base bottom part (42) of a terminal (31) between a pair of crimping pieces (43) extended from the base bottom part (42);

a step of setting the terminal (31) on which the connected core wire (13A) is arranged on an anvil (52) of a crimping apparatus (51) so that the base bottom part (42) is supported on a support surface (53) of the anvil (52), under a crimper (55) of the crimping apparatus (51); and a step of crimping the terminal (31) to the connected core wire (13A) by causing the anvil (52) and the crimper (55) to come close to each other and deforming the crimping pieces (43) by an arch groove (57) of the crimper (55) until a space between the support surface (53) and the arch groove (57) defines a predetermined crimped shape, wherein, in the step of connecting the plurality of core wires (12), the core wires (12) are formed into the connected core wire (13A) having a cross-sectional shape having a width (X) and a height (Y) in a plane orthogonal to an axis of the connected core wire (13A), the width (X) is not longer than a length obtained by subtracting two times a thickness (T) of the terminal (31) from a width (W) of the arch groove (57) in a state that the space defines the predetermined crimped shape.

(ii) The manufacturing method as set forth in the above (i), wherein the height (Y) of the cross-sectional shape formed in the step of connecting the plurality of core wires (12) is orthogonal to the width (X) of the cross-sectional shape and is not shorter than a length obtained by subtracting two times the thickness (T) of the terminal (31) from a maximum distance (H) between the support surface (53) and circular arc surfaces (57a) of the arch groove (57) in the state that the space defines the predetermined crimped shape.

(iii) The manufacturing method as set forth in the above (i) or (ii), wherein the plurality of conductor core wires (12) is made of at least one of aluminum and aluminum alloy.

According to the manufacturing method for an electric wire having a terminal with the structure of the above-described (i), the width of the section orthogonal to the axis of the connected core wire is not longer than the value (reference width) that two times a thickness of the terminal is subtracted from the width of the arch groove. Accordingly, when the terminal is crimped to the connected core wire, the connected core wire is not pressed by the terminal (the crimping pieces) until the crimping pieces of the terminal begin to be bent by the arch groove (until an actual caulking operation starts) (see FIGS. 5A and 5B). Thus, when the terminal is crimped to the connected core wire, an excessively large external force is more prevented from being applied to the connected core wire and a cancellation of a form of a single wire of the connected core wire can be more avoided than a case that the width of the section of the connected core wire is larger than the reference width. As a result, during a process that the terminal is caulked, the cancellation of the form of the single wire of the core wire bundle (the connected core wire) can be prevented as much as possible.

Accordingly, in the manufacturing method having the above-described structure, the terminal can be crimped to the connected core wire, while a connected state of the connected core wire having the plurality of conductor core wires connected together is maintained as much as possible.

According to the manufacturing method for an electric wire having a terminal with the structure of the above-described (ii), since the height of the section is not shorter than the value (the reference height) that two times the thickness of the terminal is subtracted from the maximum distance between the anvil (the support surface) and the crimper (the circular arc surfaces) at the time of completion of the pressure attachment (in the state the space between the support surface and the arch groove defines the predetermined crimped shape). Accordingly, under a state that the crimping operation is finished, the connected core wire comes into close contact with the terminal, so that voids or gaps are hardly generated between the connected core wire and the terminal (see FIG. 6). Thus, according to the manufacturing method having the above-described structure, an entire electric conductivity between the terminal and the connected core wire can be more improved.

In the manufacturing method for an electric wire having a terminal with the structure according the above-described (iii), when the terminal is crimped to the conductor core wire (an aluminum wire) made of aluminum or aluminum alloy in which an insulating property of an oxide film formed on a surface is larger than that of a conductor core wire (a copper wire) made of copper which is ordinarily used, the above-described various kinds of effects can be obtained.

According to the present invention, the manufacturing method for an electric wire having a terminal can be provided in which the terminal can be crimped to the connected core wire while a connected state of the connected core wire having the plurality of conductor core wires connected together is maintained as much as possible.

What is claimed is:

1. A manufacturing method for an electric wire having a terminal, comprising:

a step of connecting a plurality of core wires by an ultrasonic connection process to form a connected core wire;

a step of arranging the connected core wire on a base bottom part of a terminal between a pair of crimping pieces extended from the base bottom part;

a step of setting the terminal on which the connected core wire is arranged on an anvil of a crimping apparatus so that the base bottom part is supported on a support surface of the anvil, under a crimper of the crimping apparatus; and a step of crimping the terminal to the connected core wire by causing the anvil and the crimper to come close to each other and deforming the crimping pieces by an arch groove of the crimper until a space between the support surface and the arch groove defines a predetermined crimped shape, wherein, in the step of connecting the plurality of core wires, the core wires are formed into the connected core wire having a cross-sectional rectangular shape having a width and a height in a plane orthogonal to an axis of the connected core wire, the width is not longer than a length obtained by subtracting two times a thickness of the terminal from a width of the arch groove in a state that the space defines the predetermined crimped shape, wherein the height of the cross-sectional rectangular shape formed in the step of connecting the plurality of core wires is orthogonal to the width of the cross-sectional shape and is not shorter than a length obtained by subtracting two times the thickness of the terminal from a maximum distance between the support surface and circular arc surfaces of the arch groove in the state that the space defines the predetermined crimped shape, wherein the arch groove has two circular arc surfaces which protrude to a direction which separates from the support surface, which extend in a length direction of the connected core wire, and which are aligned in a width direction, and wherein, when a distance from an outer end of one of the two circular arc surfaces to an outer end of the other of the two circular arc surfaces in the width direction is a width of the arch groove, an inside distance between the pair of crimping pieces extending in a vertical direction before the step of crimping is larger than a value obtained by subtracting two times the thickness of the terminal from the width of the arch groove.

2. The manufacturing method as set forth in claim 1, wherein the plurality of core wires are made of at least one of aluminum and aluminum alloy.

* * * * *